(12) United States Patent
Kunishima et al.

(10) Patent No.: US 9,896,637 B2
(45) Date of Patent: Feb. 20, 2018

(54) SLIDING MEMBER, METHOD OF MANUFACTURING SLIDING MEMBER, AND GEAR

(71) Applicant: JTEKT CORPORATION, Osaka-shi, Osaka (JP)

(72) Inventors: Takeshi Kunishima, Shiki-gun (JP); Tomoya Nishida, Kashihara (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 15/091,950

(22) Filed: Apr. 6, 2016

(65) Prior Publication Data

US 2016/0298050 A1 Oct. 13, 2016

(30) Foreign Application Priority Data

Apr. 8, 2015 (JP) ................. 2015-079537
Apr. 8, 2015 (JP) ................. 2015-079538

(51) Int. Cl.

| | |
|---|---|
| F16C 33/20 | (2006.01) |
| C08L 75/00 | (2006.01) |
| C10M 107/42 | (2006.01) |
| F16H 55/17 | (2006.01) |
| B29B 7/20 | (2006.01) |
| B29B 7/24 | (2006.01) |
| B29D 15/00 | (2006.01) |
| F16C 33/44 | (2006.01) |
| C08K 3/00 | (2018.01) |
| C08K 5/29 | (2006.01) |
| C08K 7/14 | (2006.01) |
| F16H 1/00 | (2006.01) |
| F16C 33/00 | (2006.01) |

(Continued)

(52) U.S. Cl.
CPC ............. *C10M 107/42* (2013.01); *B29B 7/20* (2013.01); *B29B 7/24* (2013.01); *B29D 15/00* (2013.01); *C08K 3/0033* (2013.01); *C08K 5/29* (2013.01); *C08K 7/14* (2013.01); *F16C 33/00* (2013.01); *F16C 33/201* (2013.01); *F16C 33/44* (2013.01); *F16H 1/00* (2013.01); *F16H 55/17* (2013.01); *B29K 2077/00* (2013.01); *B29K 2105/0005* (2013.01); *B29K 2105/16* (2013.01); *B29K 2509/08* (2013.01); *B29K 2995/0077* (2013.01); *B29K 2995/0087* (2013.01); *B29K 2995/0088* (2013.01); *B29L 2031/04* (2013.01)

(58) Field of Classification Search
CPC ........ C10M 107/38; F16J 15/324; C08J 7/047
USPC .................. 508/100, 106; 525/907
See application file for complete search history.

(56) References Cited

U.S. PATENT DOCUMENTS

| | | |
|---|---|---|
| 2007/0087617 A1 | 4/2007 | Oberle |
| 2007/0265392 A1 | 11/2007 | Shinohara et al. |
| 2012/0128281 A1 | 5/2012 | Himeno et al. |

FOREIGN PATENT DOCUMENTS

| | | |
|---|---|---|
| EP | 0475127 A1 | 3/1992 |
| EP | 2460857 A1 | 6/2012 |

(Continued)

OTHER PUBLICATIONS

Aug. 22, 2016 Extended European Search Report issued in Patent Application No. 16164281.4.

(Continued)

*Primary Examiner* — Vishal Vasisth
(74) *Attorney, Agent, or Firm* — Oliff PLC

(57) ABSTRACT

In a method of manufacturing a sliding member including a polyamide resin and a filler, a compound having a carbodi- (Continued)

imide bond is supplied during kneading of the polyamide resin and the filler.

4 Claims, 13 Drawing Sheets

(51) Int. Cl.
*B29K 77/00* (2006.01)
*B29K 105/16* (2006.01)
*B29K 105/00* (2006.01)
*B29K 509/08* (2006.01)
*B29L 31/04* (2006.01)

(56) References Cited

FOREIGN PATENT DOCUMENTS

| JP | 2009-536891 A | 10/2009 |
| JP | 2011-032356 A | 2/2011 |
| WO | 2007/133205 A1 | 11/2007 |
| WO | 2015/056393 A1 | 4/2015 |

OTHER PUBLICATIONS

Database CA (Online) Chemical Abstracts Service, "Polyamide compositions containing epoxy or carbodiimide compounds, their manufacture, and molded products using them.", (2015).

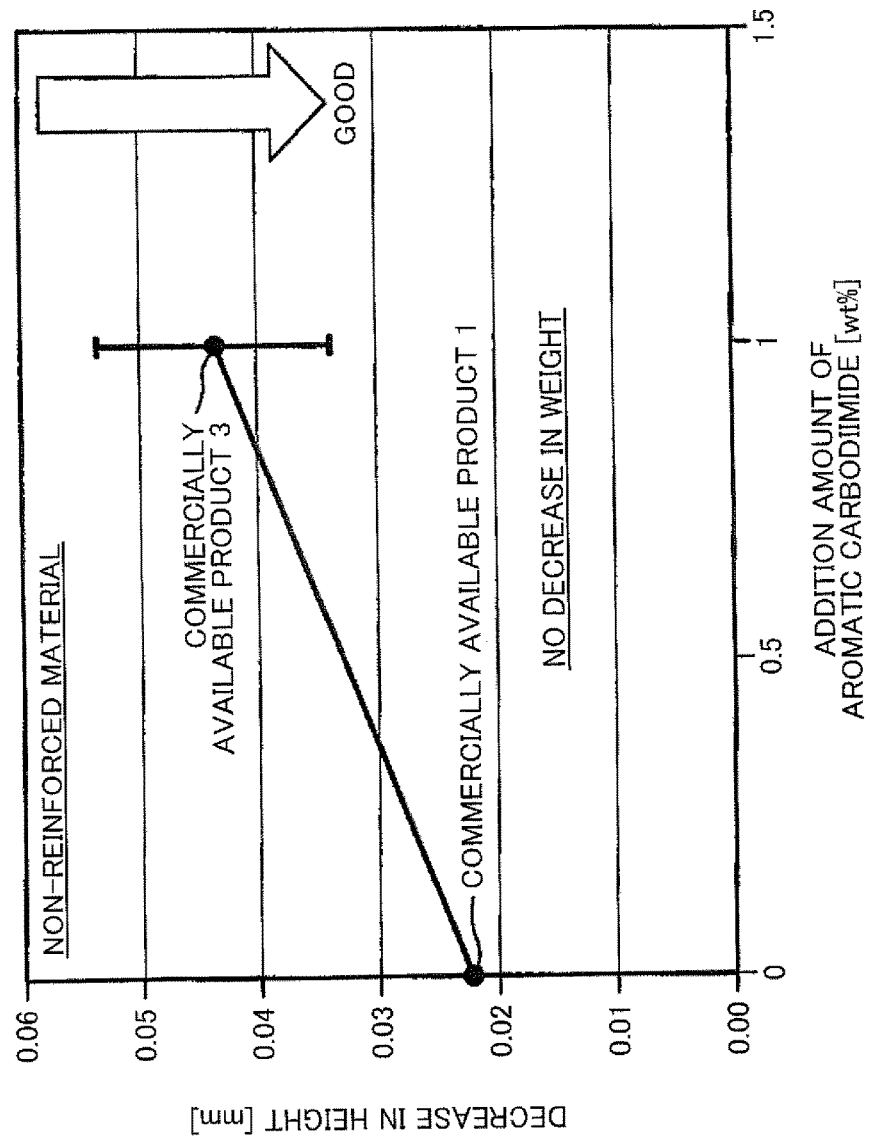

SLIDING MEMBER, METHOD OF MANUFACTURING SLIDING MEMBER, AND GEAR

INCORPORATION BY REFERENCE

The disclosure of Japanese Patent Applications No. 2015-079537 and 2015-079538 filed on Apr. 8, 2015 each including the specification, drawings and abstract is incorporated herein by reference in its entirety.

BACKGROUND OF THE INVENTION

1. Field of the Invention

The present invention relates to a resin sliding member and a method of manufacturing the same. In addition, the invention relates to a resin gear.

2. Description of Related Art

Due to light weight, high self-lubricating characteristics, and the like, polyamide 66 is widely used for a sliding member such as a gear of a reducer of an electric power steering apparatus or a resin bearing cage. For example, Published Japanese Translation of PCT application No. 2009-536891 (JP 2009-536891A) discloses a gear for an electric power steering apparatus which is manufactured using a resin composition containing polyamide 66; a copper thermal stabilizer; an aromatic polycarbodiimide; and an impact modifier which is EPDM rubber grafted with maleic anhydride.

On the other hand, recently, a reduction in size of an automobile component (a vehicle component) and an increase in output of a vehicle component have been required. Accordingly, the resin sliding member is required to have high mechanical strength and high stiffness. Therefore, an inorganic filler such as glass fiber is supplied to polyamide 66. For example, Japanese Patent Application Publication No. 2011-32356 (JP 2011-32356 A) discloses a resin cage for a rolling bearing which is manufactured using a resin composition containing polyamide 66 which contains glass fiber; and polycarbodiimide.

However, the cage that includes polyamide 66 containing glass fiber performs contact sliding at a high surface pressure, the wearing of the resin is likely to become severe. The reason for this is as follows. The glass fiber in the resin is peeled off during the contact sliding and functions as a hard abrasive. Thus, the resin is worn and peeled off.

In order to reduce the above-described wearing and peeling of the resin, the following methods are considered: (1) a method of appropriately treating a surface of glass fiber to improve the adhesion strength between a resin and the glass fiber; and (2) a method of optimizing the diameter and shape of glass fiber to reduce the counterpart aggressiveness of the glass fiber. In particular, (3) a method, in which the molecular weight of a resin is increased to increase the crack propagation resistance regarding a crack caused by the wearing and peeling of the resin, is effective.

However, in a case where glass fiber is kneaded with polyamide 66 whose molecular weight has been increased in advance in order to perform the method (3), there are the following problems. Due to high viscosity of the resin, stable production is difficult (torque overrun, heat generation, strand breaking, and the like occur in a kneader). Due to high viscosity of the resin, insufficient dispersion or breakage of the glass fiber occurs, and physical properties of the resin deteriorate.

Therefore, until now, there is no polyamide having a high molecular weight and containing glass fiber, and sufficient wear resistance has not yet been secured for future uses requiring a reduction in size and an increase in output.

For example, in an electric power steering apparatus, the rotation of an electric motor for steering assistance is transmitted to a steering operation mechanism after the speed of the rotation is reduced through a reducer and the output is amplified. As a result, torque assistance is provided for the steering operation mechanism which is operated by a driver. Typically, this reducer includes a metal worm as a pinion and a resin worm wheel as a rack wheel that mesh with each other. The worm wheel can be manufactured, for example, using a method including forming an annular resin member on an outer circumference of a core metal (sleeve) by injection molding (insert molding) or the like; and forming teeth on an outer circumference of the resin member by cutting or the like. The resin member is formed of a resin such as polyamide (for example, PA6, PA66, or PA46) or polyphenylene sulfide (PPS).

For example, JP2009-536891-A discloses a gear for an electric power steering apparatus which is manufactured using a resin composition containing polyamide 66; a copper thermal stabilizer; an aromatic polycarbodiimide; and an impact modifier which is EPDM rubber grafted with maleic anhydride. It is necessary that the metal sleeve portion should undergo involute spline processing to stop the rotation of the tooth portion. This causes an increase in costs. In addition, recently, a reduction in environmental burden has been required. Therefore, a reduction in the weight of a vehicle component has been required, and thus, the weight of a reducer of an electric power steering apparatus also needs to be reduced. The sleeve portion of the worm wheel is formed of metal and accounts for a large proportion in the total weight of the electric power steering apparatus. Therefore, it is necessary to use a lighter material for forming the sleeve portion, while ensuring necessary mechanical strength and stiffness.

On the other hand, recently, an attempt to form a sleeve portion using a resin to reduce the weight thereof has been made (for example, refer to US 2007/0087617 A). Here, polyamide provided with glass fiber is used in a sleeve portion in order to impart mechanical strength, stiffness, and dimensional stability to the sleeve portion. On the other hand, non-reinforced high-molecular-weight polyamide (containing no glass fiber) having excellent toughness is used in a tooth portion to impart wear resistance and creep resistance to the tooth portion. The tooth portion is formed by inserting a resin sleeve portion into a mold of a molding machine and injecting a resin to an outer circumference of the sleeve portion.

There is a difference in linear expansion coefficient between the resin constituting the sleeve portion and the resin constituting the tooth portion. Therefore, due to a difference in expansion and shrinkage rate at a high temperature or a low temperature, impact resistance of a product is poor, which may cause heat shock cracking or the like. Due to expansion, a gap may be generated between the sleeve portion and the tooth portion, which may cause a decrease in durability life. Further, since it is necessary to form the sleeve portion and the tooth portion through separate injection molding processes, the manufacturing costs are high.

As a countermeasure against the above-described problems, a method of using the same glass fiber reinforced resin in both a sleeve portion and a tooth portion to integrally mold the tooth portion and the sleeve portion is considered. In this case, however, it is considered that the wearing of the tooth portion becomes severe, which results in a decrease in durability life. The reason for this is as follows. The glass fiber in the tooth portion is peeled off during the contact sliding and functions as a hard abrasive. Thus, the resin constituting the tooth portion is worn and peeled off.

On the other hand, a method of increasing the molecular weight of a resin to suppress the wearing and peeling of the resin caused by glass fiber may be proposed, but there is a limit in increasing the molecular weight through polymerization of monomers. In addition, from the viewpoint of productivity, it is difficult to knead glass fiber with a resin whose molecular weight has been increased in advance.

SUMMARY OF THE INVENTION

The invention provides a sliding member and a method of manufacturing the same, in which mechanical strength and wear resistance can be improved. The invention also provides a gear including a sleeve portion and a tooth-forming portion formed of the same resin, the sleeve portion having required mechanical strength, required stiffness, and required dimensional stability, and the tooth-forming portion having required wear resistance.

According to an aspect of the invention, there is provided a method of manufacturing a sliding member, the sliding member including a polyamide resin and a filler. In the method, a compound having a carbodiimide bond is supplied during kneading of the polyamide resin and the filler. The phrase "during kneading" includes "at the start of kneading of the polyamide resin and the filler". That is, the filler and the compound having the carbodiimide bond may be simultaneously supplied to the polyamide resin.

According to another aspect of the invention, there is provided a sliding member that is manufactured by a method including adding a compound having a carbodiimide bond during kneading of a polyamide resin and a filler to prepare a raw resin; and molding the raw resin. According to the above-described configuration, during kneading of the polyamide resin and the filler and injection molding, the action of the compound having the carbodiimide bond can promote dehydration condensation between a terminal carboxyl group (—COOH) and a terminal amino group (—$NH_2$) of the polyamide resin. As a result, plural polymer chains of polyamide resin, which have been formed by polymerization in advance, can be connected to each other in a chain reaction, and the molecular weight of the resin can be increased.

Further, since the compound having the carbodiimide bond is supplied during kneading, the decomposition of the polyamide resin caused by excessive dehydration condensation can be suppressed. Therefore, the molecular weight of the polyamide resin can be increased to a level which has not been achieved in the related art. Before the supply of the compound having the carbodiimide bond, the chain reaction of the polyamide resin does not occur, and the molecular weight of the polyamide resin is not high. In this state, the viscosity of the polyamide resin is relatively low. Therefore, by kneading the polyamide resin and the filler with each other, the filler can be appropriately dispersed in the entire polyamide resin.

As a result, a sliding member having excellent mechanical strength and wear resistance can be obtained. As compared to a case where the polyamide resin, the filler, and the compound having the carbodiimide bond are simultaneously supplied to a kneader and then start to be kneaded or a case where the polyamide resin and the compound having the carbodiimide bond are simultaneously supplied from a main feeder of a kneader (from the beginning) and start to be kneaded, the occurrence of torque overrun, heat generation, strand breaking, and the like in the kneader can be reduced. As a result, the sliding member can be stably produced.

In the sliding member and the method of manufacturing the same according to the above-described aspects of the invention, a number average molecular weight Mn of a resin constituting the sliding member may be 30,000 or higher. In the sliding member and the method of manufacturing the same according to the above-described aspects of the invention, a mixing proportion of glass fiber serving as the filler may be 10 mass % to 50 mass % with respect to a total amount of the kneaded material.

By mixing the glass fiber in the above-described range, it is possible to secure sufficient mechanical strength of the sliding member while reducing the amount of the glass fiber which is a factor causing the wearing of the sliding member. In the sliding member and the method of manufacturing the same according to the above-described aspects of the invention, as the filler, glass fiber having a diameter of 6 μm to 15 μm may be mixed (added). By mixing the glass fiber having a diameter in the above-described range, the contact area between the glass fiber and the polyamide resin can be made relatively large. Therefore, the mechanical strength and stiffness of the sliding member can be improved appropriately. That is, with a reduced amount of the glass fiber, the mechanical strength and the like can be secured. Therefore, the amount of the glass fiber which is the factor causing the wearing of the sliding member can be reduced, and wear resistance can be improved. In addition, as the diameter of the glass fiber decreases, aggressiveness to a counterpart (counterpart aggressiveness) decreases, and thus an effect causing the wearing and peeling of the resin is small. From this point of view as well, wear resistance can be improved.

In the sliding member and the method of manufacturing the same according to the above-described aspects of the invention, a mixing proportion of the compound having the carbodiimide bond may be 0.5 mass % to 4 mass % with respect to the total amount of a kneaded material. By mixing the compound having the carbodiimide bond in the above-described range, the resin having a number average molecular weight Mn of 30,000 or higher can be easily obtained. On the other hand, since the amount of the compound having the carbodiimide bond is not excessive, it is possible to reduce, for example, the possibility of an increase in resin pressure (viscosity) during kneading, the possibility of heat generation, the possibility of the thermal decomposition of the polyamide resin and the carbodiimide caused by the heat generation, and the possibility of a decrease in the strength of adhesion between the resin and the filler caused by deterioration in the aggregation of the filler.

In the method of manufacturing a sliding member according to the above-described aspect of the invention, after the polyamide resin is supplied to a cylinder of a kneader, the compound having the carbodiimide bond may be supplied to an intermediate portion of the cylinder together with the filler or may be supplied to a portion of the cylinder that is positioned downstream of a portion of the cylinder to which the filler is supplied.

The sliding member according to the above-described aspect of the invention is formed of a resin containing a polyamide resin and a filler, and a number average molecular weight Mn of the resin is 30,000 or higher. According to this configuration, the polyamide resin contains the filler. Therefore, sufficient mechanical strength of the sliding member can be secured. The number average molecular weight Mn of the resin is 30,000 or higher, and crack propagation resistance of the resin is excellent. Therefore, even when a crack is caused due to the wearing and peeling of the resin caused by the filler, the propagation rate of the crack can be reduced. As a result, the wear amount of the resin can be reduced.

According to still another aspect of the invention, there is provided a gear including a sleeve portion and a tooth-forming portion. The gear is manufactured by the method according to the above-described aspect of the invention. The sleeve portion and the tooth-forming portion are integrally molded using a raw resin obtained by kneading the polyamide resin, the filler, and the compound having the carbodiimide bond. According to the above-described configuration, during kneading of the polyamide resin and the filler and injection molding, the action of the compound having the carbodiimide bond promotes dehydration condensation between a terminal carboxyl group (—COOH) and a terminal amino group (—NH$_2$) of the polyamide resin. As a result, plural polymer chains of the polyamide resin, which have been formed by polymerization in advance, can be connected to each other in a chain reaction, and the molecular weight (mass) of the raw resin can be increased. Therefore, the wearing and peeling of the resin caused by the filler can be suppressed, and thus required wear resistance of the tooth-forming portion can be achieved. In addition, since the raw resin contains the filler, required mechanical strength, required stiffness, and required dimensional stability of the sleeve portion can be achieved (obtained). Thus, the possibility of cracking, short durability life, or the like is small, the costs can be reduced, and the weight can be reduced as compared to a case where a metal sleeve portion is used.

In the gear according to the above-described aspect of the invention, the resin constituting the sleeve portion and the tooth-forming portion may further contain a lubricant. Due to the lubricant, a lubricating effect between the molecules of the raw resin can be obtained. Therefore, the viscosity of the resin during molding of the gear can be reduced. Therefore, even when the molecular weight of the raw resin is high, molding can be performed at a relatively low temperature, and thus the thermal decomposition of the resin during molding can be suppressed. As a result, since molding can be performed while high molecular weight of the raw resin is maintained, the mechanical strength and wear resistance of the raw resin can be appropriately maintained.

In the gear according to the above-described aspect of the invention, the lubricant may be a metal soap. In the gear according to the above-described aspect of the invention, the resin constituting the sleeve portion and the tooth-forming portion may contain 15 mass % to 50 mass % of glass fiber as the filler with respect to a total amount of the resin. By mixing the glass fiber in the above-described range, it is possible to secure sufficient mechanical strength and stiffness of the sleeve portion while reducing the amount of the glass fiber which is the factor causing the wearing of the tooth-forming portion.

In the gear according to the above-described aspect of the invention, the resin constituting the sleeve portion and the tooth-forming portion may contain glass fiber having a diameter of 6 µm to 15 µm as the filler. By mixing the glass fiber having a diameter in the above-described range, the contact area between the glass fiber and the polyamide resin can be made relatively large. Therefore, the mechanical strength and stiffness of the sleeve portion can be appropriately improved. That is, with a reduced amount of the glass fiber, the mechanical strength and the like of the sleeve portion can be secured. Therefore, the amount of the glass fiber which is the factor causing the wearing of the tooth-forming portion can be reduced, and the wear resistance of the tooth-forming portion can be improved. In addition, as the diameter of the glass fiber decreases, counterpart aggressiveness decreases, and thus an effect causing the wearing and peeling of the resin is small. From this point of view as well, the wear resistance of the tooth-forming portion can be improved.

In the gear according to the above-described aspect of the invention, a mixing proportion of the compound having the carbodiimide bond may be 0.5 mass % to 4 mass % with respect to a total amount of the raw resin. By mixing the compound having the carbodiimide bond in the above-described range, the raw resin having a number average molecular weight Mn of 30,000 or higher can be easily obtained. On the other hand, since the amount of the compound having the carbodiimide bond is not excessive, it is possible to reduce, for example, the possibility of an increase in resin pressure (viscosity) during kneading, the possibility of heat generation, the possibility of the thermal decomposition of the polyamide resin and the carbodiimide caused by the heat generation, and the possibility of a decrease in the strength of adhesion between the resin and the filler caused by deterioration in the aggregation of the filler.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 13 is a graph showing the results of commercially available products in a friction and wear test.

DETAILED DESCRIPTION OF EMBODIMENTS

Figure 1:
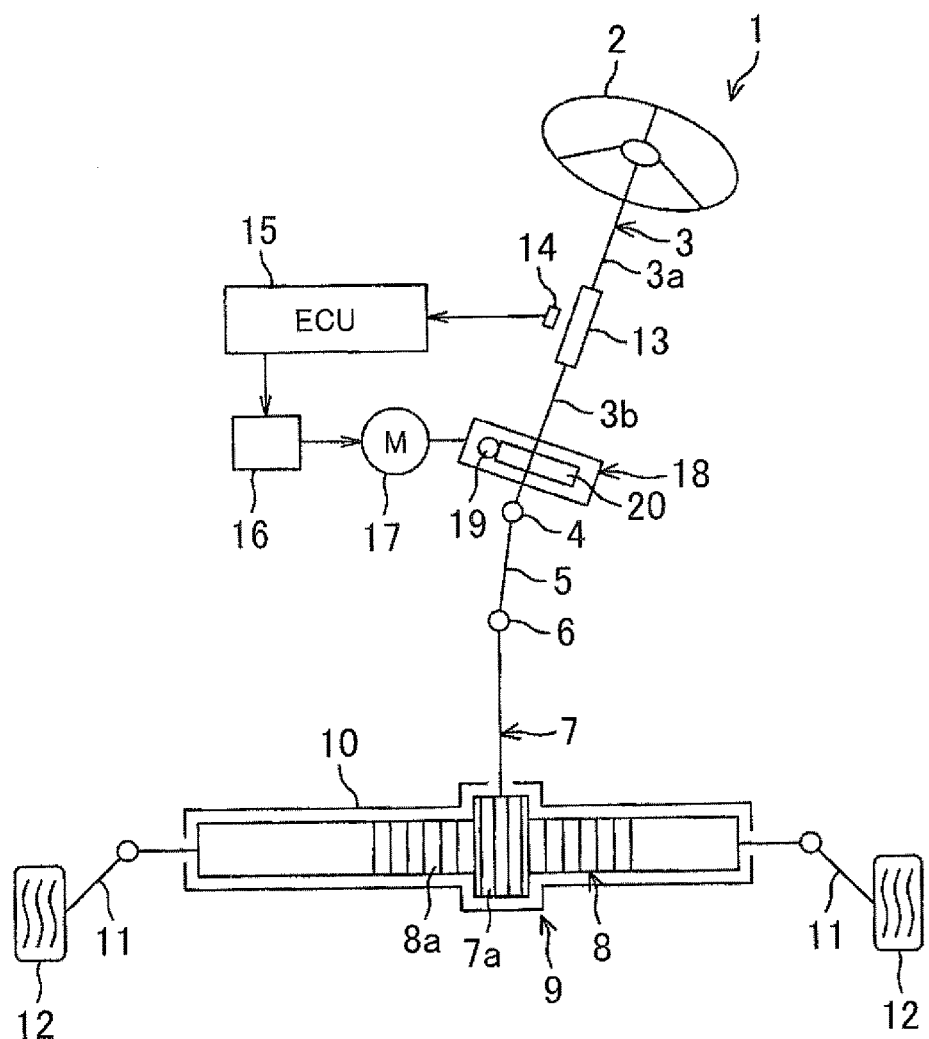
FIG. 1 is a schematic diagram showing an electric power steering apparatus in which a worm wheel according to an embodiment of the invention is provided.

Hereinafter, an embodiment of the invention will be described in detail with reference to the accompanying drawings. FIG. 1 is a schematic diagram showing an electric power steering apparatus 1 in which an intermediate shaft 5 according to an embodiment of the invention is provided. The electric power steering apparatus 1 includes a steering shaft 3 that is connected to a steering wheel 2 so as to rotate together with the steering wheel 2 in an integrated manner; an intermediate shaft 5 that is connected to the steering shaft 3 through a universal joint 4; a pinion shaft 7 that is connected to the intermediate shaft 5 through a universal joint 6; and a rack bar 8. The rack bar 8 includes rack teeth 8a that mesh with pinion teeth 7a of the pinion shaft 7. The rack bar 8 serves as a steered shaft that extends in a right-left direction of a vehicle (an automobile).

The pinion shaft 7 and the rack bar 8 constitute a steering operation mechanism 9 that is a rack and pinion mechanism. The rack bar 8 is supported in a rack housing 10 fixed to a vehicle body through plural bearings (not shown) so as to be linearly reciprocable. Opposite end portions of the rack bar 8 protrude from opposite sides of the rack housing 10, and a tie rod 11 is joined to each of the end portions.

Each of the tie rods 11 is connected to a corresponding steered wheel 12 through a knuckle arm (not shown). When the steering shaft 3 is rotated by the operation of the steering wheel 2, the rotation is converted into a linear motion of the rack bar 8 in the right-left direction of the vehicle, through the pinion teeth 7a and the rack teeth 8a. As a result, the steered wheels 12 are steered.

The steering shaft 3 is divided into an input shaft 3a connected to the steering wheel 2 and an output shaft 3b connected to the pinion shaft 7. The two shafts 3a, 3b are coaxially connected to each other through a torsion bar 13 so as to rotate relative to each other. The torsion bar 13 is provided with a torque sensor 14 that detects a steering torque based on a relative rotation displacement between the two shafts 3a, 3b, and a torque detection result obtained by the torque sensor 14 is output to an electronic control unit (ECU) 15.

In the ECU 15, the driving of the electric motor 17 for steering assistance is controlled through a drive circuit 16 based on the torque detection result, a vehicle speed detection result input from a vehicle speed sensor (not shown), and the like. After the speed of the rotation output from the electric motor 17 is reduced through a reducer 18, the rotation is transmitted to the pinion shaft 7 and is converted into a linear motion of the rack bar 8, thereby assisting the steering. The reducer 18 includes a worm shaft 19 (pinion) that serves as an input shaft and is rotated by the electric motor 17; and a worm wheel 20 (rack wheel) that meshes with the worm shaft 19 and is connected to the output shaft 3b of the steering shaft 3 so as to rotate together with the steering shaft 3 in an integrated manner. The worm wheel 20 is an example of the sliding member and the gear according to the present invention.

Figure 2:
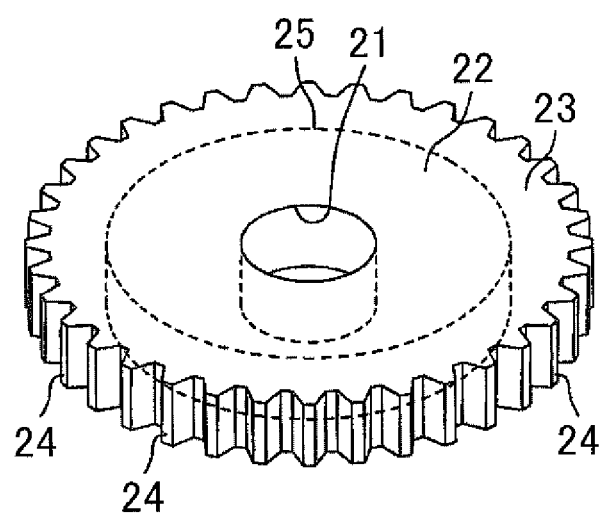
FIG. 2 is a perspective view schematically showing the worm wheel.

FIG. 2 is a perspective view schematically showing the worm wheel 20. The worm wheel 20 is formed in an annular shape having a through-hole 21 provided at the center thereof. The output shaft 3b of the steering shaft 3 (refer to FIG. 1) is inserted into the through-hole 21. The worm wheel 20 is formed of a resin molded object as an integrated object and includes a sleeve portion 22 and a tooth-forming portion 23 that are concentrically provided around the through-hole 21. The sleeve portion 22 and the tooth-forming portion 23 are formed as a continuous resin layer. In this embodiment, the sleeve portion 22 is defined as an annular region, and the tooth-forming portion 23 is defined as an annular region provided around the sleeve portion 22. Plural teeth 24 are formed on an outer circumference of the tooth-forming portion 23 along a circumferential direction. Here, the configuration where the two regions (in this embodiment, the sleeve portion 22 and the tooth-forming portion 23) form a continuous layer implies that there is no physical boundary surface between the two regions. For example, a material boundary such as a grain boundary in material phases formed due to use of different resin materials may be present between the sleeve portion 22 and the tooth-forming portion 23. On the other hand, for example, when a tooth-forming portion is formed by performing separate injection molding on an outer circumference of a metal or resin sleeve portion, a physical boundary surface may appear between the sleeve portion and the tooth-forming portion. In FIG. 2, for clarification, an imaginary boundary 25 is shown between the sleeve portion 22 and the tooth-forming portion 23.

Figure 3:
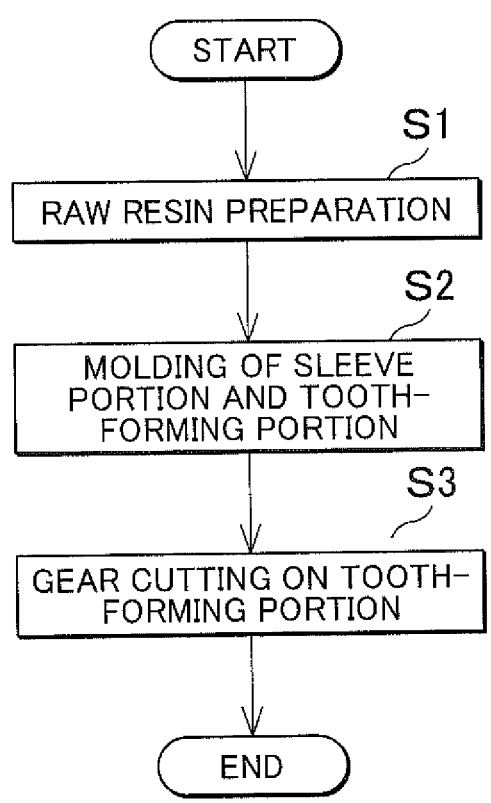
FIG. 3 is a flowchart showing a manufacturing process for the worm wheel.
Figure 4:
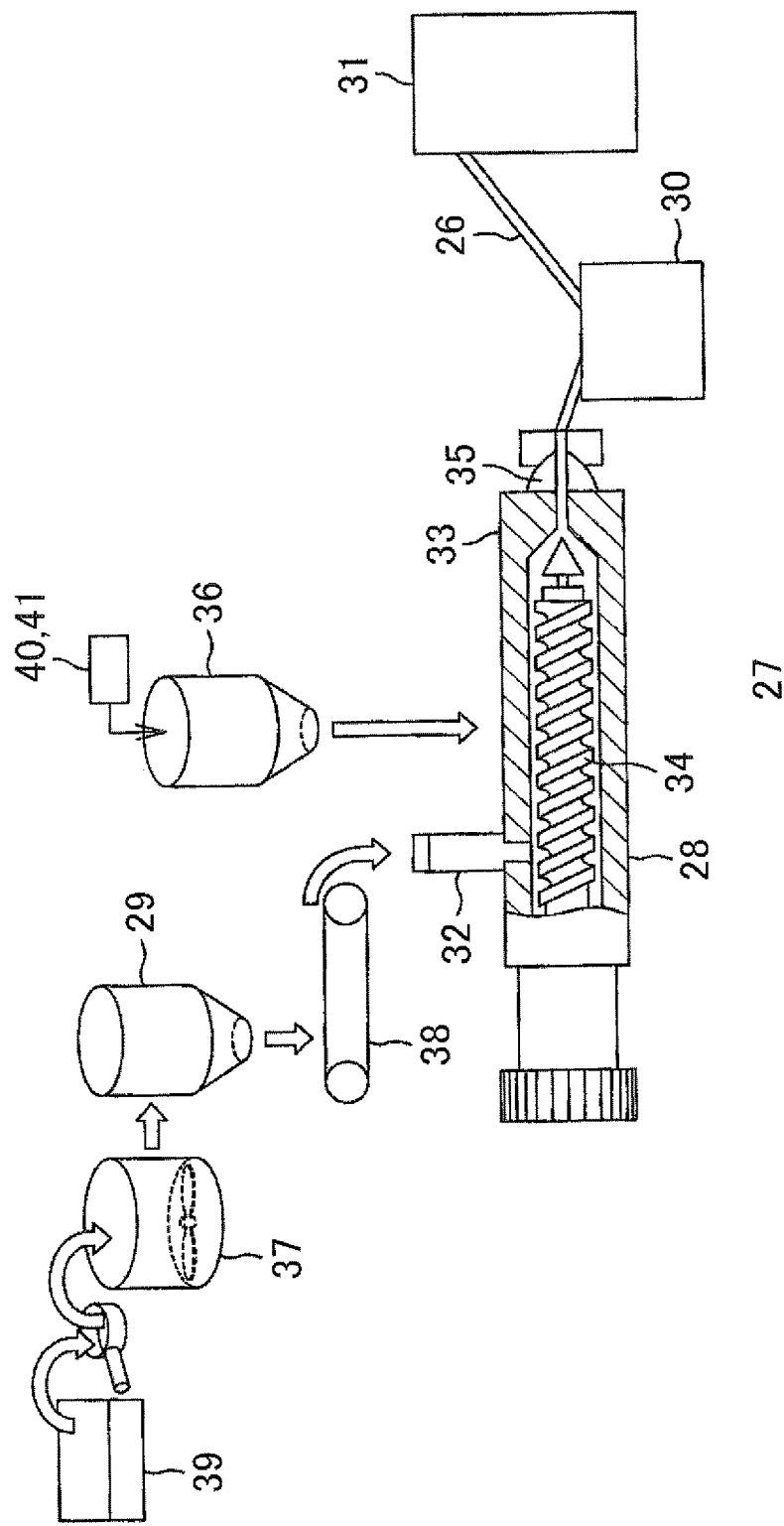
FIG. 4 is a diagram showing a step relating to the preparation of a raw resin.
Figure 5:
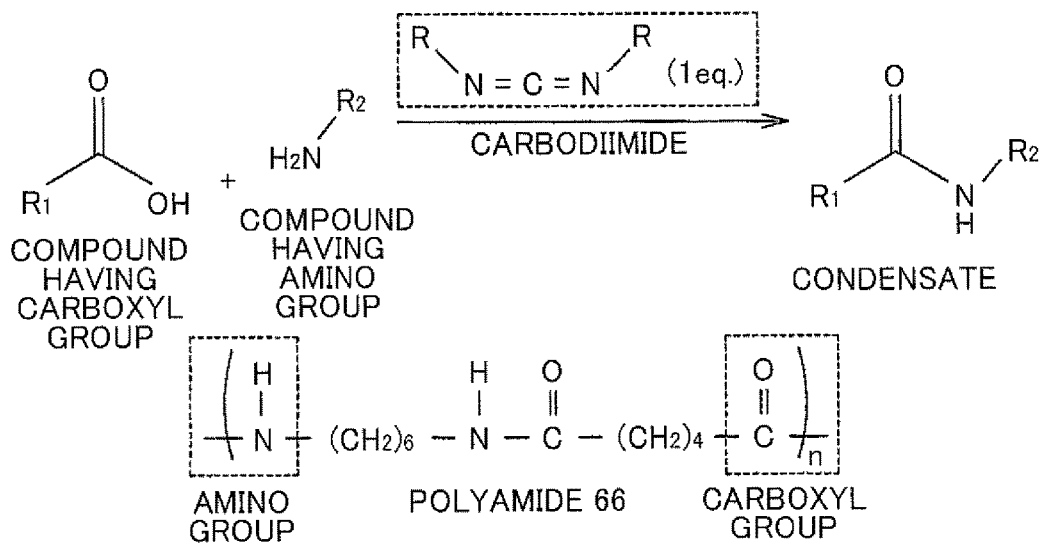
FIG. 5 is a diagram showing a reaction mechanism of dehydration condensation by carbodiimide.

Next, a method of manufacturing the worm wheel 20 will be described. FIG. 3 is a flowchart showing a manufacturing process for the worm wheel 20. FIG. 4 is a diagram showing a step relating to the preparation of a raw resin 26. FIG. 5 is a diagram showing a reaction mechanism of dehydration condensation by carbodiimide 41. In order to manufacture the worm wheel 20, first, the raw resin 26 constituting the worm wheel 20 is prepared (S1). For the preparation of the raw resin 26, for example, a kneader 27 shown in FIG. 4 is used.

For example, the kneader 27 includes a main body 28, a tank 29, a cooling water tank 30, and a pelletizer 31. The main body 28 includes a main feeder 32, a cylinder 33, a screw 34, and a nozzle 35. A side feeder 36 is attached to a portion between the main feeder 32 and the nozzle 35 (a portion positioned downstream of the main feeder 32). The main body 28 is not particularly limited. For example, a well-known kneader such as a twin screw (multi-screw) extruder or a single screw extruder can be used.

A stirrer 37 is provided upstream of the tank 29. Raw materials that are mixed in the stirrer 37 are supplied to the main feeder 32 of the main body 28 through the tank 29 and a belt type weight scale 38 that is provided downstream of the tank 29. In order to prepare the raw resin 26, first, the polyamide resin 39 and a given additive are supplied to the cylinder 33 through the main feeder 32 which is a common supply port. The polyamide resin 39 and the given additive may be supplied to the tank 29 separately, or after being mixed (by a dry blending method, i.e., by a masterbatch method) in the stirrer 37.

Examples of the polyamide resin 39 include an aliphatic polyamide (for example, PA6, PA66, PA12, PA612, PA610, or PA11) and an aromatic polyamide (for example, PA6T, PA9T, or PPA). Among these polyamide resins, an aliphatic polyamide is preferable, and polyamide 66 (PA66) is more preferable. Among these polyamide resins, one kind may be used alone, or two or more kinds may be used in combination. The number average molecular weight of the polyamide resin used may be, for example, 15,000 to 25,000. In addition to the polyamide resin 39, a base resin supplied to the main feeder 32 may contain, for example, a thermoplastic elastomer (for example, an ethylene elastomer modified with acid, EGMA, EPDM, or a polyamide elastomer). Due to the addition of the thermoplastic elastomer, impact resistance can be improved.

A mixing proportion of the polyamide resin 39 may be, for example, 45 mass % to 90 mass % with respect to the total amount of the materials used for the preparation of the raw resin 26. In addition, as the given additive, a lubricant is preferable. Due to the lubricant, a lubricating effect between the molecules of the raw resin 26 can be obtained. Therefore, the viscosity of the worm wheel 20 during molding can be reduced. Therefore, even when the molecular weight (mass) of the raw resin 26 is high, molding can be performed at a relatively low temperature, and thus the thermal decomposition of the resin during molding can be suppressed. As a result, since molding can be performed while maintaining high molecular weight of the raw resin 26, the mechanical strength and wear resistance of the raw resin 26 can be appropriately maintained.

The lubricant is not particularly limited as long as it can reduce the viscosity of the raw resin 26 during the molding of the worm wheel 20. For example, a well-known lubricant can be used, and examples thereof include a metal soap such as a metal stearate; a hydrocarbon such as paraffin wax or synthetic polyethylene wax; a fatty acid such as stearic acid; a higher alcohol such as stearyl alcohol; an aliphatic amide such as stearic acid amide or oleic acid amide; an ester such as an alcohol fatty acid ester; and a silicone compound. Among these lubricants, a metal soap is preferable, and a metal stearate is more preferable. In a case where the lubricant is added, a mixing proportion of the lubricant may be, for example, 0.01 mass % to 1 mass % with respect to the total amount of the materials used for the preparation of the raw resin 26.

The polyamide resin 39 supplied to the cylinder 33 and the optionally added additive are kneaded with each other by the rotation of the screw 34. Regarding kneading conditions, for example, the temperature of the cylinder 33 may be 275° C. to 325° C., and the rotation speed of the screw 34 may be 100 rpm to 500 rpm. Next, a filler 40 and a compound 41 having a carbodiimide bond (hereinafter, referred to simply as "carbodiimide") are simultaneously supplied to the cylinder 33 through the side feeder 36 which is a common supply port.

Examples of the filler 40 used include a short-fiber filler such as glass fiber, carbon fiber, aramid fiber, or cellulose fiber; a plate-shaped filler such as glass flake; and a micro reinforceable filler such as carbon nanotubes or carbon nanofibers. Among these fillers, one kind or two or more kinds may be used. Among these fillers, a short-fiber filler is preferable, glass fiber is more preferable, and flat glass fiber is still more preferable. By using flat glass fiber, the surface roughness of the tooth-forming portion 23 after gear cutting can be reduced.

When glass fiber is used, it is preferable that the glass fiber should have a diameter of 6 μm to 15 μm. By mixing (adding) the glass fiber having a diameter in the above-described range, the contact area between the glass fiber and the polyamide resin in the raw resin 26 can be made relatively large. Therefore, during the molding of the worm wheel 20, the mechanical strength and stiffness (rigidity) of the sleeve portion 22 can be improved appropriately. That is, with a reduced amount of the glass fiber, sufficient mechanical strength and the like of the sleeve portion 22 can be secured. Therefore, the amount of the glass fiber which is a factor causing the wearing of the tooth-forming portion 23 can be reduced, and wear resistance can be improved. In addition, as the diameter of the glass fiber decreases, aggressiveness to a counterpart (counterpart aggressiveness) decreases, and thus an effect causing the wearing and peeling of the resin is small. From this point of view as well, wear resistance can be improved. Further, when the counterpart aggressiveness of the glass fiber is reduced, an effect of the glass fiber on the worm shaft 19 which meshes with the worm wheel 20 can be reduced. Therefore, the time of curing (for example, a heat treatment such as quenching) on the worm shaft 19 can be shortened.

In addition, a mixing proportion of the filler 40 (glass fiber) may be, for example, 10 mass % to 50 mass %, preferably 15 mass % to 50 mass %, and more preferably 25 mass % to 50 mass % with respect to the total amount of the materials used for the preparation of the raw resin 26. By mixing (adding) the glass fiber in the above-described range, it is possible to secure sufficient mechanical strength of the sleeve portion 22 while reducing the amount of the glass fiber which is a factor causing the wearing of the tooth-forming portion 23. The carbodiimide 41 used is not particularly limited as long as it is a compound having a carbodiimide group (—N=C=N—). The carbodiimide 41 may be monocarbodiimide having one carbodiimide group or polycarbodiimide having plural carbodiimide groups. Various kinds of carbodiimides such as an aliphatic carbodiimide, an aromatic carbodiimide, or a modified carbodiimide can be used. Among these carbodiimides, an aliphatic carbodiimide is preferable, and specific examples of a commercially available product include "CARBODILITE (registered trade name) HMV-15CA" (manufactured by Nisshinbo Chemical Inc.).

A mixing proportion of the carbodiimide 41 may be, for example, 0.5 mass % to 4 mass % with respect to the total amount of the materials used for the preparation of the raw resin 26. By mixing (adding) the carbodiimide 41 in the above-described range, the raw resin 26 having a number average molecular weight Mn of 30,000 or higher can be appropriately obtained. On the other hand, since the amount of the carbodiimide 41 is not excessive, it is possible to reduce, for example, the possibility of an increase in resin pressure (viscosity) during kneading, the possibility of heat generation, the possibility of the thermal decomposition of the polyamide resin 39 and the carbodiimide 41 caused by the heat generation, and the possibility of a decrease in the strength of adhesion between the resin and the filler 40 caused by deterioration in the aggregation of the filler 40.

In a case where the carbodiimide 41 is powder, for example, the carbodiimide 41 may be supplied from the side feeder 36 alone or after being mixed (by a dry blending method, i.e., by a masterbatch method) with the polyamide resin. The filler 40 and the carbodiimide 41 are added to a kneaded material which is being transported in cylinder 33, the kneaded material including the polyamide resin 39 and the optionally added additive. Next, the components are further kneaded with each other. The time required from the supply of the carbodiimide 41 to the injection of the kneaded material from the nozzle 35 (the kneading time for the carbodiimide 41) may be, for example, 1 second to 1 minute. Accordingly, the distance of the side feeder 36 from the nozzle 35 may be appropriately set based on the kneading time.

After the supply of the carbodiimide 41, the kneaded material is injected from the nozzle 35 as the raw resin 26 in the form of a strand, is cooled to be solidified in the cooling water tank 30, and then is pelletized by the pelletizer 31. Through the above-described steps, the raw resin 26 in which the filler 40 is dispersed in the polyamide resin 39 is obtained. Regarding the manufacturing of the worm wheel 20, in the next step, the sleeve portion 22 and the tooth-forming portion 23 are integrally molded (S2 of FIG. 3). In this step, a mold (not shown) is prepared, and the raw resin 26 (pellet) obtained in the step shown in FIG. 4 is melted and injected into the mold. The mold may have a shape for forming a cylindrical structure in which the plural worm wheels 20 are arranged. Next, after cooling the raw resin 26 to be solidified for a given time, the integrally molded cylindrical structure of the worm wheels 20 is extracted from the mold. The cylindrical worm wheels 20 are cut out from the cylindrical structure one by one.

Finally, gear cutting (the formation of the teeth 24) is performed on the tooth-forming portion 23 of the worm wheel 20 (S3). As a result, the worm wheel 20 shown in FIG. 2 is obtained. According to the above-described method, the carbodiimide 41 is supplied during the kneading of the polyamide resin 39 and the filler 40 (at the start of the kneading of the polyamide resin 39 and the filler 40). As a result, during kneading and injection molding, as shown in FIG. 5, the action of the carbodiimide 41 can promote dehydration condensation between a terminal carboxyl group (—COOH) and a terminal amino group (—NH$_2$) of the polyamide resin 39 (in FIG. 5, polyamide 66). As a result, plural polymer chains of the polyamide resin 39, which have been formed by polymerization in advance, can be connected to each other in a chain reaction, and the molecular weight of the resin can be increased. For example, the number average molecular weight of the raw resin 26 after the reaction can be made high, that is, the number average molecular weight of the raw resin 26 after the reaction is 30,000 or higher.

Further, since the carbodiimide 41 is supplied during kneading, the decomposition of the polyamide resin 39 caused by excessive dehydration condensation can be suppressed. Therefore, the molecular weight of the polyamide resin 39 can be increased to a level which has not been achieved in the related art. Before the supply of the carbodiimide 41, the chain reaction in the polyamide resin 39 does not occur, and the molecular weight of the polyamide resin 39 is not high (for example, approximately Mn=20,000). In this state, the viscosity of the polyamide resin 39 is relatively low. Therefore, by kneading the polyamide resin 39 and the filler 40 with each other, the filler 40 can be appropriately dispersed in the entire polyamide resin 39.

As a result, the required mechanical strength, required stiffness, and required dimensional stability of the sleeve portion 22 can be secured. The number average molecular weight Mn of the resin is 30,000 or higher, and crack propagation resistance of the resin is excellent. Therefore, even when a crack is caused due to the wearing and peeling of the resin caused by the filler 40, the propagation rate of the crack can be reduced. As a result, the wear amount of the tooth-forming portion 23 can be reduced, and thus the required wear resistance of the tooth-forming portion 23 can be achieved (obtained). Thus, the possibility of cracking, short durability life, or the like is small, the costs can be reduced, and the weight can be reduced as compared to a case where a metal sleeve portion is used.

Accordingly, since an increase in the change amount of the distance between axes of the worm shaft 19 and the worm wheel 20 can be suppressed, the generation of a rattling sound caused by the increase in the change amount can be prevented, and the durability life can be improved. In particular, if the size of the worm wheel 20 is further reduced in the future, the load will become larger than ever before, and a reduction gear ratio will become smaller than ever before, and as a result, a high torque may be applied to the worm wheel 20. If wear resistance to the above-described high torque is low, the durability life of the worm wheel 20 may be reduced. However, the worm wheel 20 having excellent wear resistance as in the case of the embodiment can be suitably applied to future uses requiring a reduction in size and an increase in output.

As compared to a case where the polyamide resin 39, the filler 40, and the carbodiimide 41 are simultaneously supplied to the main body 28 and then start to be kneaded or a case where the polyamide resin 39 and the carbodiimide 41 are simultaneously supplied from the main feeder 32 of the kneader 27 (from the beginning) and start to be kneaded, the occurrence of torque overrun, heat generation, strand breaking, and the like in the main body 28 can be reduced. As a result, the worm wheel 20 can be stably produced.

Hereinabove, the embodiment of the invention has been described, but the invention can be implemented in another embodiment. In the above-described embodiment, the worm wheel 20 includes the sleeve portion 22 and the tooth-forming portion 23 which are integrally molded. However, for example, a configuration in which the resin tooth-forming portion 23 is closely attached to the metal sleeve portion 22 may be adopted. In this case, the tooth-forming portion 23 is formed using the raw resin 26.

Figure 6:
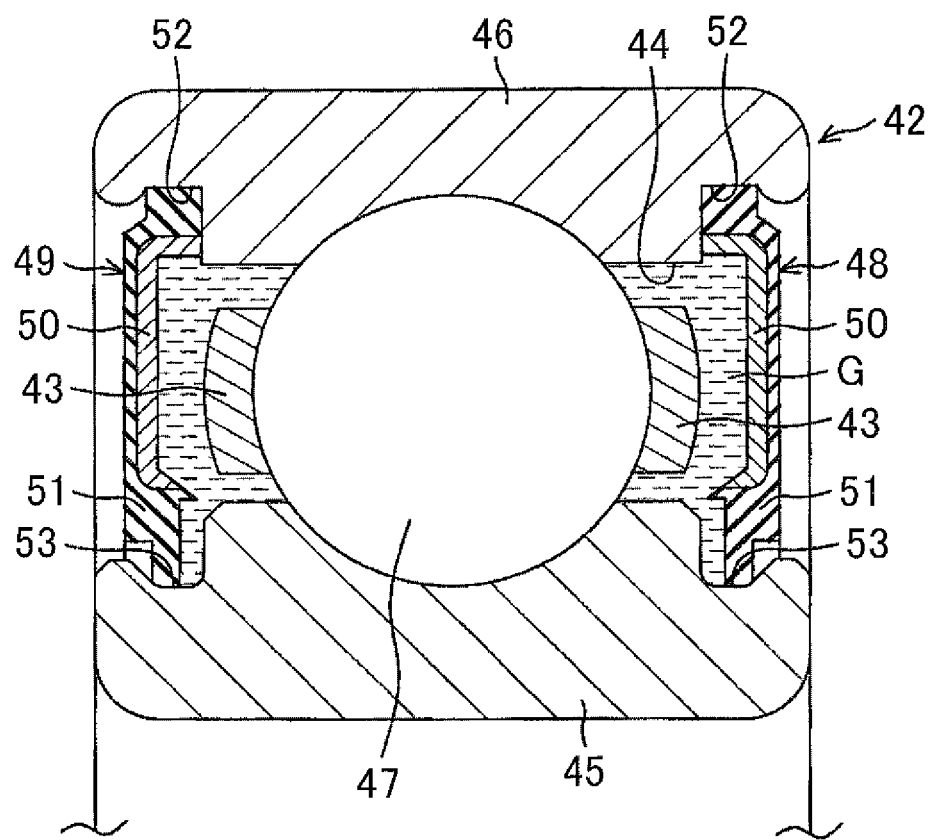
FIG. 6 is a sectional view showing a rolling bearing according to an embodiment of the invention.

The sliding member according to the invention can be applied to sliding members other than the above-described worm wheel 20, for example, various gears or resin cages. For example, the sliding member according to the invention may be applied to a cage 43 of a rolling bearing 42 shown in FIG. 6. The rolling bearing 42 includes an inner ring 45 and an outer ring 46 as a pair of raceway members that form an annular region 44 therebetween; balls 47 as plural rolling elements that are arranged in the region 44 and roll relative to the inner ring 45 and the outer ring 46; the cage 43 that is arranged in the region 44 and retains the balls 47; a grease G that fills the region 44; and a pair of ring-shaped seal members 48, 49 that are fixed to the outer ring 46 and slide on the inner ring 45.

The seal members 48, 49 include ring-shaped core metals 50, 50 and ring-shaped rubber bodies 51, 51 that are baked to the core metals 50, 50, respectively. Outer circumferential portions of the seal members 48, 49 are fitted and fixed to groove portions 52, 52 formed on opposite end surfaces of the outer ring 46, and inner circumferential portions of the seal members 48, 49 are fitted and fixed to groove portions 53, 53 formed on opposite end surfaces of the inner ring 45. The grease G is sealed in the region 44 such that the region 44 is substantially filled with the grease G. The region 44 is formed (defined) between the two rings 45, 46 by the pair of seal members 48, 49.

Figure 7:
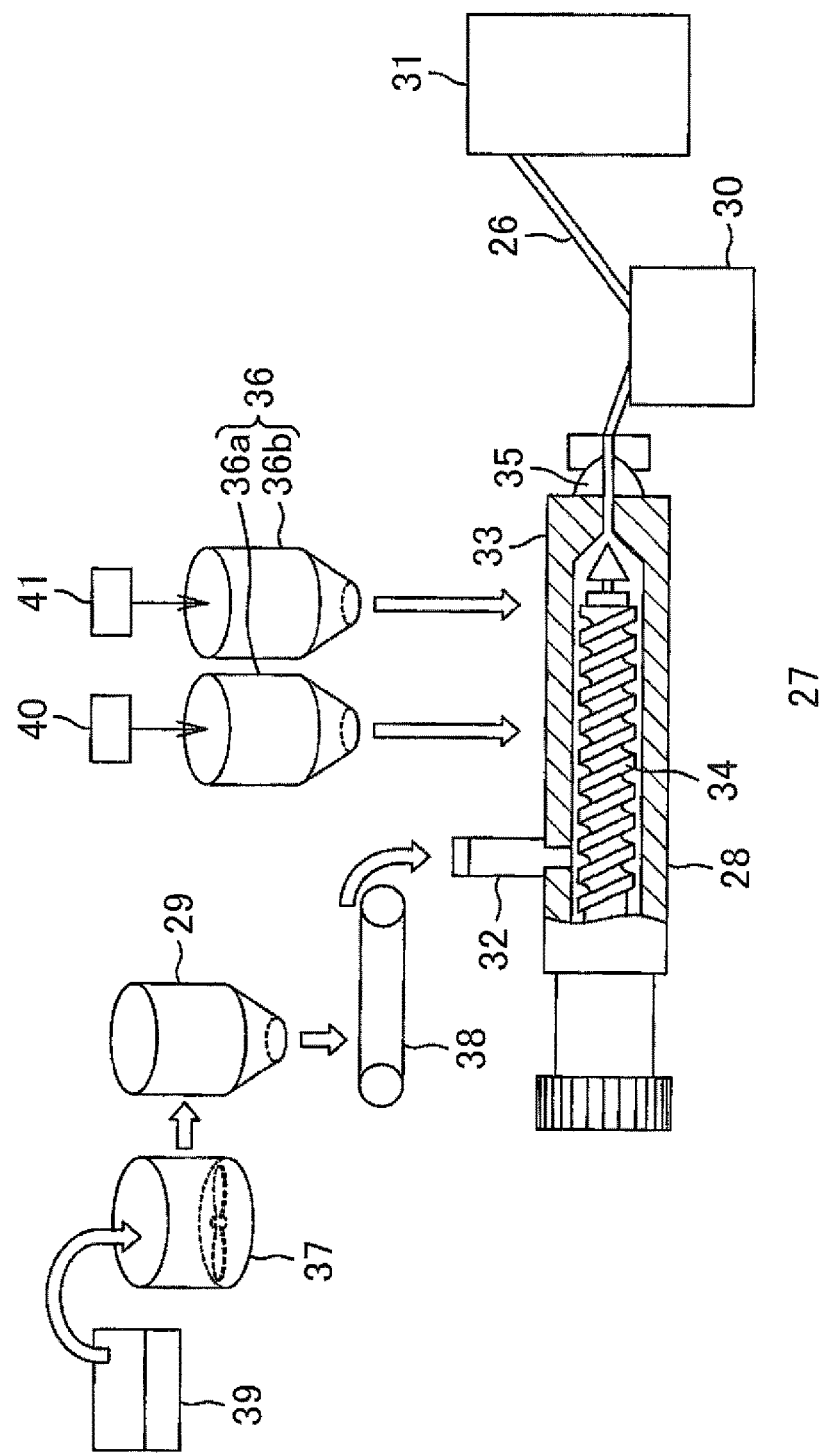
FIG. 7 is a diagram showing a step relating to the preparation of the raw resin.

The main body 28 may include two side feeders 36 as shown in FIG. 7. For example, the side feeder 36 may include a first side feeder 36a and a second side feeder 36b that is positioned downstream of the first side feeder 36a. In this case, a configuration of supplying the polyamide resin 39 alone from the main feeder 32, supplying the filler 40 from the first side feeder 36a, and supplying the carbodiimide 41 from the second side feeder 36b may be adopted.

The filler 40 may be supplied to the cylinder 33 through the main feeder 32 together with the polyamide resin 39. Further, the carbodiimide 41 may not be supplied from the side feeder 36 or may not be supplied during the kneading of the polyamide resin 39 and the filler 40. For example, the carbodiimide 41 may be supplied from the main feeder 32 after being mixed with the polyamide resin 39. In this case as well, the effects of the invention can be achieved. Further, various design changes can be made within the scope of the invention.

Next, the invention will be described based on Examples, Reference Examples, and the like. However, the invention is not limited to the following Examples.

Example 1 will be described. In the kneader 27 having a configuration shown in FIG. 4, 64.7 mass % of polyamide 66 manufactured by Asahi Kasei Chemicals Corporation ("1402S", number average molecular weight Mn: 23,000), 33.3 mass % of glass fiber manufactured by Nitto Boseki co., Ltd. ("CS3PE-455S"), and 2 mass % of carbodiimide manufactured by Nisshinbo Chemical Inc. (CARBODILITE (registered trade name) "HMV-15CA") were kneaded with each other to obtain a raw resin. Using this raw resin, a test sample was molded. The polyamide 66 was supplied to the main feeder 32, and the glass fiber and the carbodiimide were supplied to the side feeder 36. In Reference Example 1, a test sample was prepared under the same conditions as in Example 1, except that the carbodiimide was supplied to the main feeder 32. In Reference Example 2, a test sample was prepared under the same conditions as in Example 1, except that polyamide 66 having a number average molecular weight Mn of 27,000 was used; the mixing proportion of the glass fiber was changed to 15 mass %; and carbodiimide was not added. In Reference Example 3, a test sample was prepared under the same conditions as in Example 1, except that carbodiimide was not added. Next, Commercially Available Product 1 will be described. A test sample was molded using polyamide 66 manufactured by Asahi Kasei Chemicals Corporation (non-reinforced grade "1502S" of LEONA (registered trade name)). The glass fiber and the carbodiimide were not added. Next, Commercially Available Product 2 will be described. A test sample was molded using polyamide 66 manufactured by DuPont ("E51HSBNC010" of ZYTEL (registered trade name)). The glass fiber and the carbodiimide were not added. Next, Commercially Available Product 3 will be described. A test sample was molded by adding 1 mass % of an aromatic carbodiimide manufactured by Rhein Chemie Japan Ltd. ("STABAXOL (registered trade name) P400") to Commercially Available Product 1. Glass fiber was not added.

Figure 8:
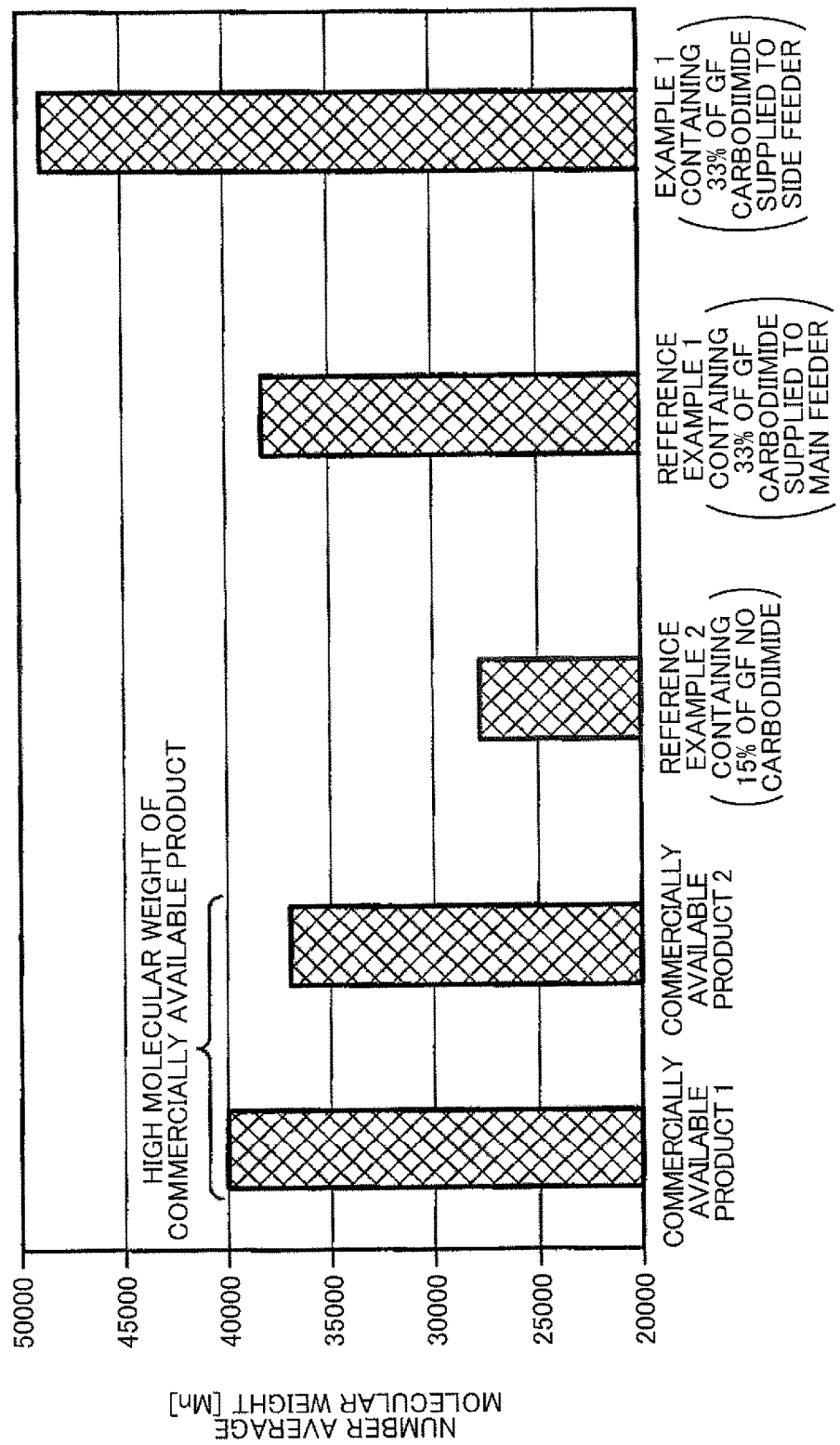
FIG. 8 is a graph showing number average molecular weights Mn of Example, Reference Examples, and commercially available products.

Next, an evaluation test will be described. Regarding the test samples other than Reference Example 3, the number average molecular weight Mn was measured by gel permeation chromatography (GPC). The results are shown in FIG. 8. It was found from a comparison between Example 1 and Reference Example 2 of FIG. 8 that a number average molecular weight Mn of 30,000 or higher can be achieved by kneading polyamide 66 and carbodiimide with each other. Further, it was found from a comparison between Example 1 and Reference Example 1 that, when carbodiimide is supplied to the side feeder 36, the molecular weight can be increased to be higher than that in a case where carbodiimide is supplied to the main feeder 32. Further, it was found from a comparison between Example 1 and Commercially Available Products 1 and 2 that, by supplying carbodiimide to the side feeder 36, the molecular weight can be increased to a level which cannot be achieved in general Commercially Available Products 1 and 2.

Figure 9:
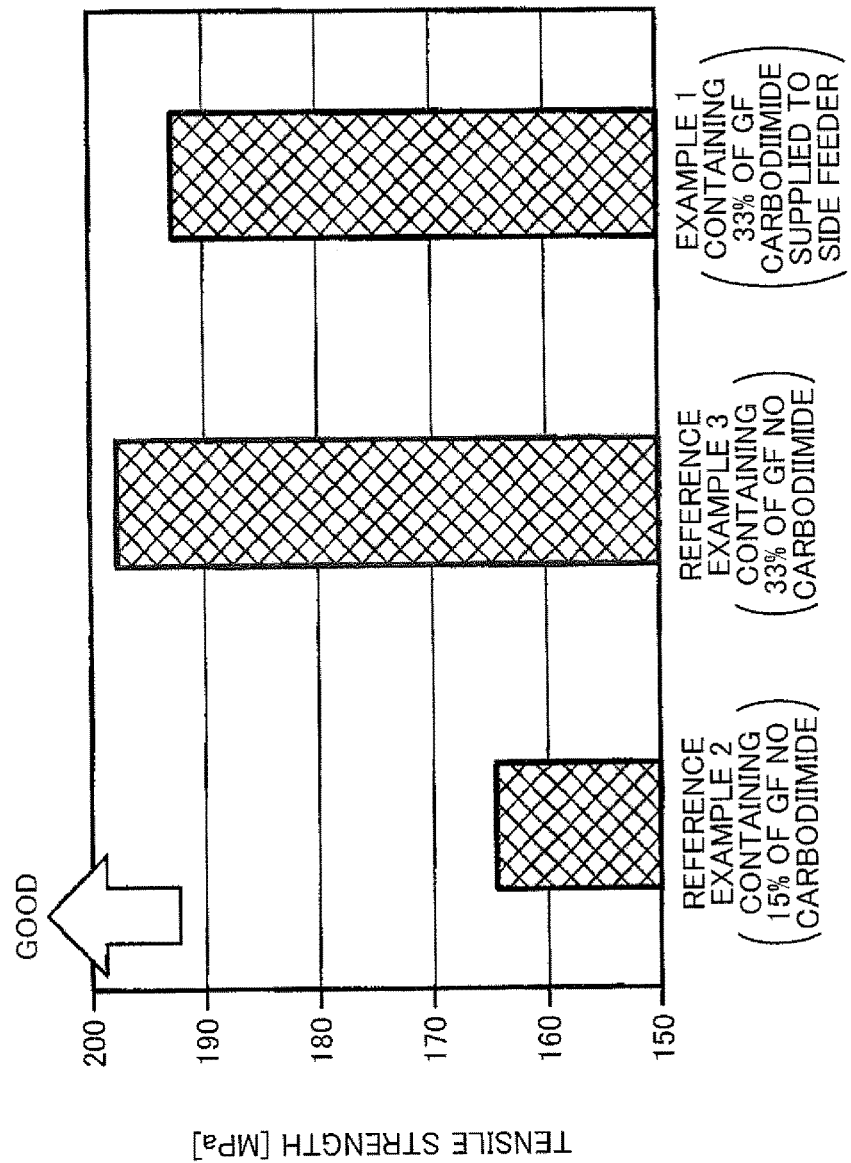
FIG. 9 is a graph showing the results of Example and Reference Examples in a tensile strength test.
Figure 10:
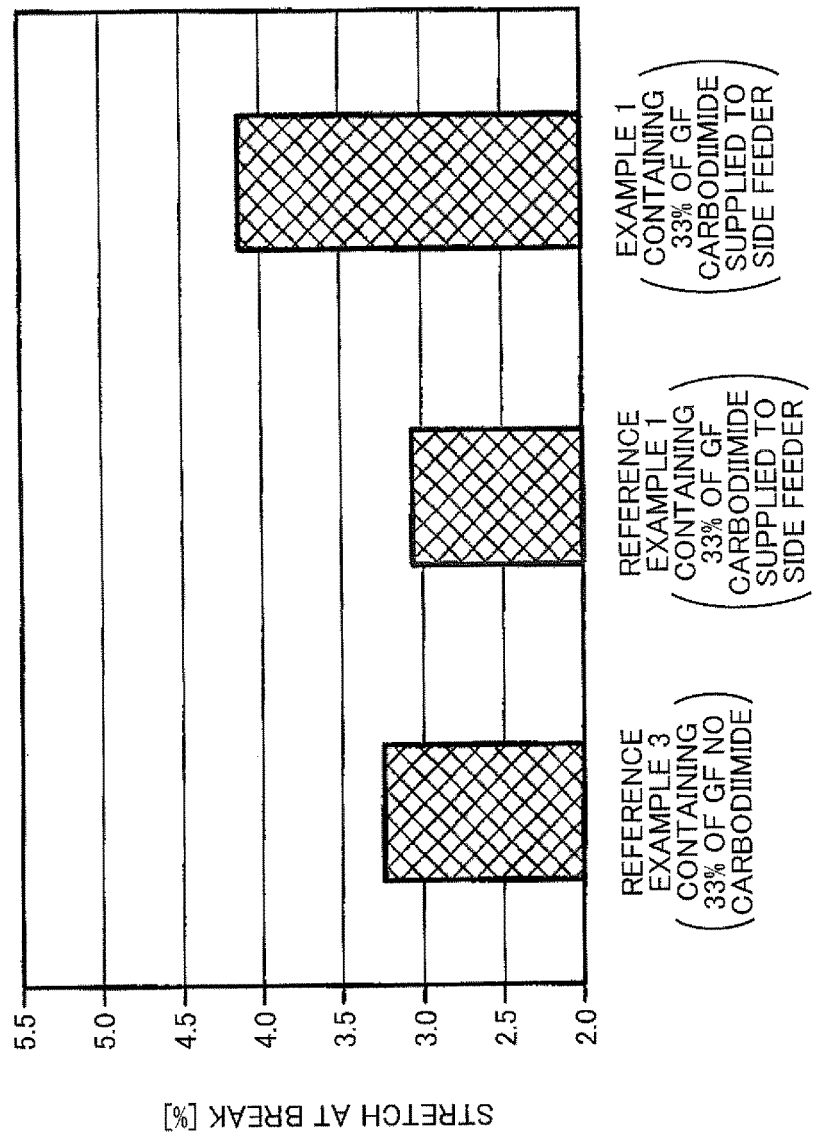
FIG. 10 is a graph showing the results of Example and Reference Examples in a stretch at break test.
Figure 11:
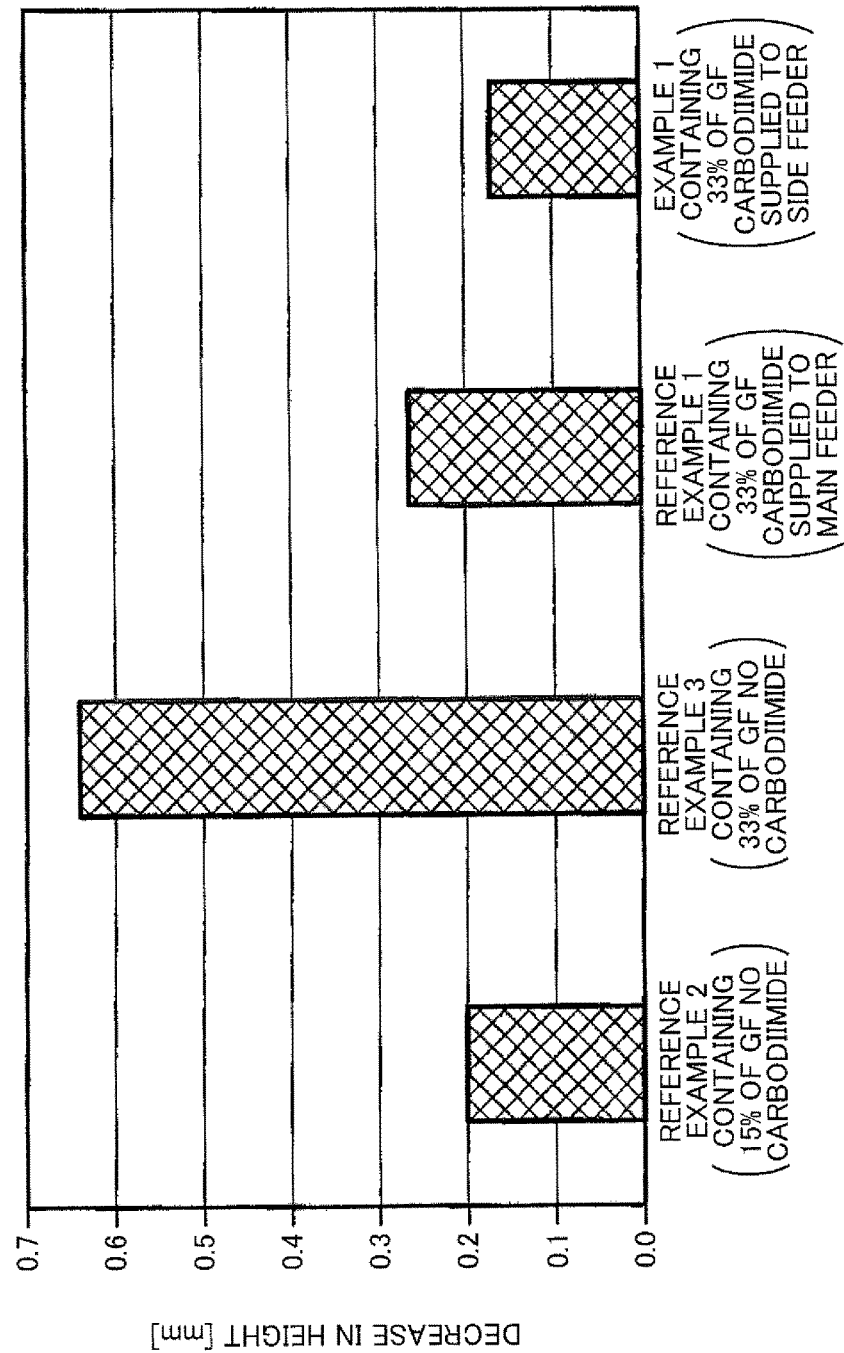
FIG. 11 is a graph showing the results of Example and Reference Examples in a friction and wear test.
Figure 12:
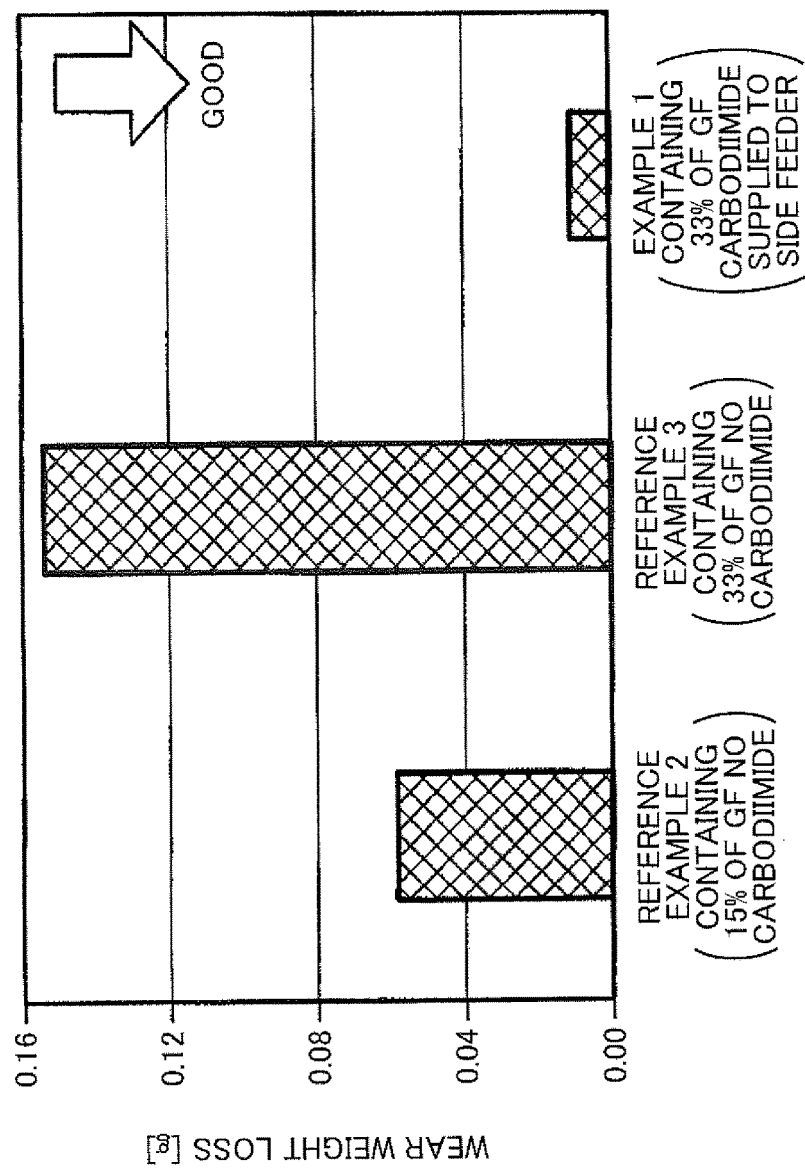
FIG. 12 is a graph showing the results of Example and Reference Examples in a friction and wear test.

Regarding Example 1 and Reference Examples 2 and 3, the tensile strength was measured according to JIS K 7161. The results are shown in FIG. 9. It was found from FIG. 9 that, even when carbodiimide is added (Example 1), the tensile strength (mechanical strength) is as high as that in a case where carbodiimide is not added (Reference Example 3). Regarding Example 1 and Reference Examples 1 and 3, the stretch at break (i.e., the elongation at the moment of rupture of the test sample) was measured according to JIS K 7161. The results are shown in FIG. 10. It was found from FIG. 10 that, by supplying carbodiimide to the side feeder 36 (Example 1), it is possible to achieve higher stretch at break (higher mechanical strength) than that in a case where carbodiimide is supplied to the main feeder 32 (Reference Example 1) or a case where carbodiimide is not added (Reference Example 3). Regarding Example 1, Reference Examples 1 to 3, and Commercially Available Products 1 and 3, a Suzuki-type friction and wear test was performed, and the wear amount (mm) and the wear weight loss (g) were measured. The results are shown in FIGS. 11, 12, and 13.

Test conditions are as follows. Sliding was performed using a four-point contact metal roller and a resin ring. Lubrication was performed using grease. Test temperature was room temperature (RT). Contact was intermittently performed by intermittently performing operation. It was found from FIGS. 11 and 12 that, in Example 1 and Reference Example 1 in which the molecular weight is increased by carbodiimide, the wear resistance is higher than that of Reference Examples 2 and 3 in which carbodiimide is not added. The decrease in height (wear amount) of Reference Example 2 is substantially the same as that of Example 1 and Reference Example 1, and the reason for this is presumed to be as follows. The test sample of Reference Example 2 contains glass fiber in an amount which is approximately half (15 mass %) of that of Example 1 and Reference Example 1, and the absolute amount of the glass fiber, which is the factor causing the wearing of the resin, is small.

It was found from FIG. 13 that, even when carbodiimide is added to non-reinforced high-molecular-weight polyamide 66, an effect of improving wear resistance cannot be obtained. The reason for this is as follows. When sliding occurs at a high surface pressure under grease lubrication, creep deformation mainly occurs and wearing hardly occurs. Thus, an effect of improving wear resistance obtained by increasing the molecular weight is not exhibited.

What is claimed is:

1. A method of manufacturing a sliding member, the sliding member including a polyamide resin and a filler, the method comprising:
    supplying the polyamide resin to a cylinder of a kneader from a first supply port and
    kneading the polyamide resin in the kneader;
    supplying the filler to the cylinder of the kneader from the first supply port, or a second supply port positioned downstream of the first supply port, and kneading the filler together with the polyamide resin in the kneader;
    supplying a compound having a carbodiimide bond to the cylinder of the kneader from the second supply port, or a third supply port positioned downstream of the second supply port, and kneading the compound having the carbodiimide bond together with the polyamide resin and the filler in the kneader to prepare a raw resin; and
    molding the raw resin to form the sliding member.

2. The method according to claim 1, wherein a number average molecular weight of a resin constituting the sliding member is 30,000 or higher.

3. The method according to claim 2, wherein a mixing proportion of the compound having the carbodiimide bond is 0.5 mass % to 4 mass % with respect to a total amount of a kneaded material.

4. The method according to claim 3, wherein a mixing proportion of glass fiber serving as the filler is 10 mass % to 50 mass % with respect to the total amount of the kneaded material.

* * * * *